(12) United States Patent
Gingrich et al.

(10) Patent No.: US 8,899,016 B2
(45) Date of Patent: Dec. 2, 2014

(54) INTEGRATED WGS/ECD EXHAUST TREATMENT DEVICE FOR INTERNAL COMBUSTION ENGINE HAVING AN EGR LOOP

(75) Inventors: Jess W. Gingrich, San Antonio, TX (US); Steven H. Almaraz, Seguin, TX (US)

(73) Assignee: Southwest Research Institute, San Antonio, TX (US)

( * ) Notice: Subject to any disclaimer, the term of this patent is extended or adjusted under 35 U.S.C. 154(b) by 164 days.

(21) Appl. No.: 13/420,936

(22) Filed: Mar. 15, 2012

(65) Prior Publication Data
US 2013/0239547 A1 Sep. 19, 2013

(51) Int. Cl.
*F01N 3/00* (2006.01)

(52) U.S. Cl.
USPC .......... 60/278; 60/274; 60/298; 60/299; 60/320; 60/605.2; 123/568.11; 123/568.12; 123/568.19

(58) Field of Classification Search
USPC ........ 60/274, 278, 297, 298, 299, 320, 605.2; 123/568.11, 568.12, 568.18, 568.19
See application file for complete search history.

(56) References Cited

U.S. PATENT DOCUMENTS

| | | | |
|---|---|---|---|
| 6,301,887 B1 * | 10/2001 | Gorel et al. | 60/605.2 |
| 6,625,978 B1 * | 9/2003 | Eriksson et al. | 60/311 |
| 7,210,469 B1 * | 5/2007 | Saele | 123/568.12 |
| 7,316,157 B2 * | 1/2008 | Ohsaki | 73/114.69 |
| 7,481,040 B2 * | 1/2009 | Lutz | 60/278 |
| 7,921,647 B2 * | 4/2011 | Grunditz et al. | 60/605.2 |

* cited by examiner

*Primary Examiner* — Binh Q Tran
(74) *Attorney, Agent, or Firm* — Chowdhury & Georgakis PC; Ann C. Livingston

(57) ABSTRACT

An integrated water-gas-shift (WGS) and emissions control device (ECD) catalyst for treating exhaust from an internal combustion engine. The engine is assumed to have an EGR loop, such that exhaust is recirculated back to the engine's intake. A WGS catalyst on the EGR loop, for conditioning the EGR flow, is integrated with a catalyzed ECD on the main exhaust line, for reducing pollutant emissions.

18 Claims, 5 Drawing Sheets

INTEGRATED WGS/ECD EXHAUST TREATMENT DEVICE FOR INTERNAL COMBUSTION ENGINE HAVING AN EGR LOOP

TECHNICAL FIELD OF THE INVENTION

This invention relates to internal combustion engines, and more particularly to such engines having a recirculated exhaust gas (EGR) loop.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an integrated WGS/ECD catalyst for use with an internal combustion engine having an EGR loop. The integrated catalyst integrates a water-gas shift (WGS) catalyst used on the EGR loop with an emissions control device (ECD) used on the engine's main exhaust line.

Figure 1:
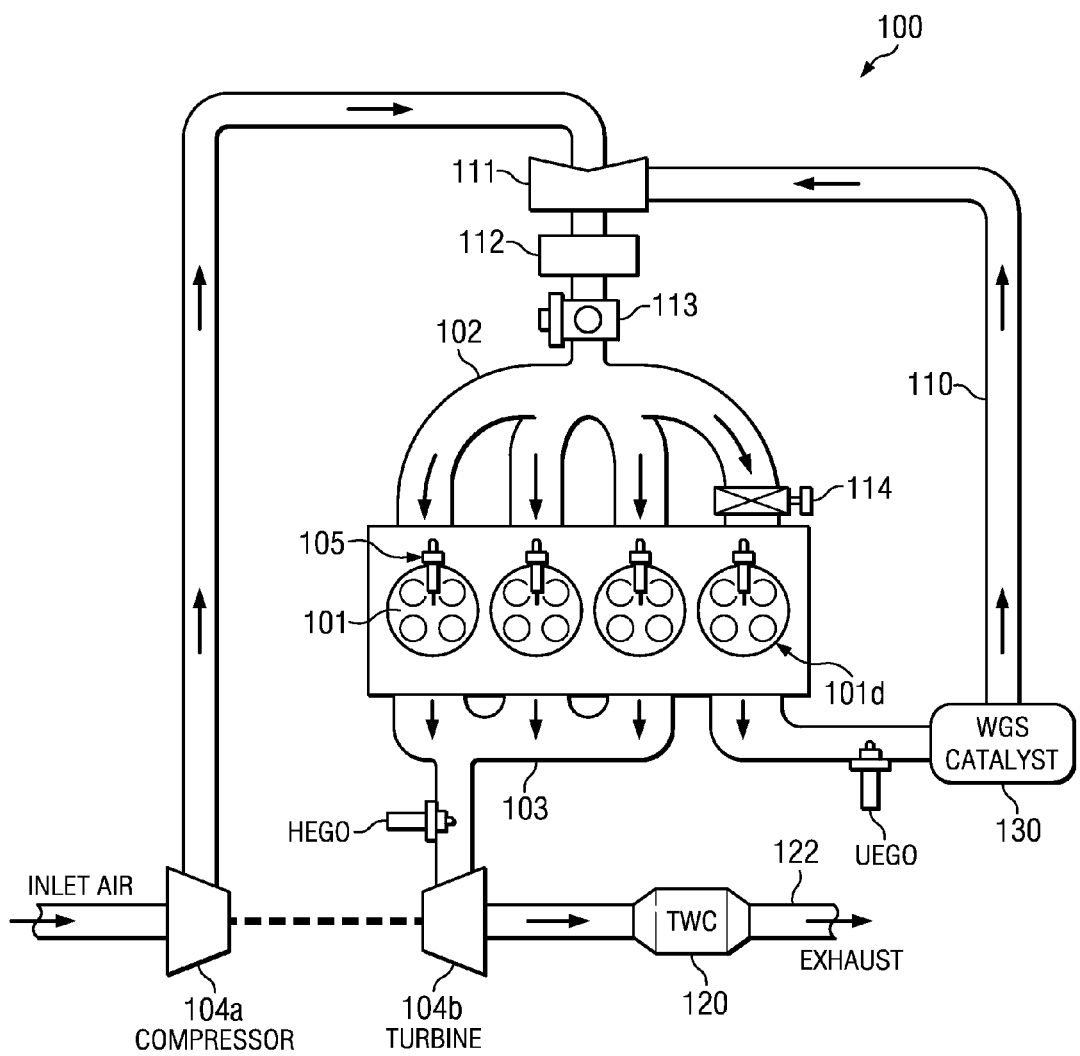
FIG. 1 illustrates an example of an internal combustion engine having one dedicated EGR cylinder and a conventional WGS catalyst.

FIG. 1 illustrates a "dedicated EGR" engine system, where one or more of the engine's cylinders is used to generate exhaust gas to be recirculated and used as a diluent for the intake charge of the entire engine. The entire exhaust gas output of the dedicated EGR cylinder is recirculated, and none of the exhaust of the non-dedicated EGR cylinders is recirculated. U.S. patent application Ser. No. 12/140,878, entitled "EGR System with Dedicated EGR Cylinders", to Alger, et al, discusses dedicated EGR and conditioning of EGR exhaust, and is incorporated by reference herein.

The exhaust treatment aspects of the dedicated EGR engine system of FIG. 1 are "conventional" in the sense that the WGS catalyst 130 and the TWC device 120 are two separate devices on two separate exhaust paths. The following description is directed to an integrated WGS/ECD catalyst that replaces these two exhaust treatment devices.

However, the concepts discussed herein are not limited to dedicated EGR engine systems. As explained below in connection with FIGS. 7 and 8, the integrated WGS/ECD catalyst of FIGS. 2-5 could be used with any engine system having an EGR loop and a main exhaust line.

More specifically, FIG. 1 illustrates an EGR-equipped internal combustion engine 100 having four cylinders 101. One of the cylinders is a dedicated EGR cylinder, and is identified as cylinder 101d. EGR exhaust is conditioned with a WGS catalyst 130 and non-EGR exhaust is treated with a three-way catalyst (TWC) 120.

In the system of FIG. 1, engine 100 is spark ignited, and each cylinder 101 has an associated spark plug 105. However, the methods described herein are also suitable for use with compression ignited engines. The engine's non-dedicated EGR cylinders 101 can be operated with a lean burn or stoichiometric air-fuel ratio. In this example, the non-dedicated EGR cylinders are assumed to run stoichiometrically, allowing the use of TWC 120.

The dedicated-EGR cylinder 101d is run rich. All of its exhaust is recirculated back to the intake manifold 102. The exhaust of the other three cylinders 101 is directed to an exhaust system via an exhaust manifold 103. In this example, the engine is said to have "25% dedicated EGR" because one of its four cylinders has all of its exhaust redirected to the intake manifold 102. In other dedicated EGR systems, there may be a different number of engine cylinders 101, and/or there may be more than one dedicated EGR cylinder 101d.

Engine 100 is equipped with a turbocharger, specifically a compressor 104a and a turbine 104b. Although not explicitly shown, the cylinders 101 have some sort of means for introducing fuel into the cylinders, such as fuel injectors. The fuel delivery system can be fumigated, port injected, or direct injected.

The exhaust from the dedicated EGR cylinder 101d is recirculated via an EGR line 110. A water-gas-shift (WGS) catalyst 130 is placed along the EGR line 110.

The EGR line 110 joins the intake line at a mixer 111. The mixture of recirculated exhaust and fresh air is cooled with a cooler 112. A throttle 113 is used to control the amount of intake into the intake manifold 102.

An EGR valve 114 may be used to control the intake into the EGR cylinder 101d. Intake into the EGR cylinder 101d may also be controlled using variable valve timing or other flow-altering means.

The dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, TWC device 120 can be effectively used to reduce pollutant emission. The exhaust exits the TWC device 120 via a tailpipe 122.

Figure 2:
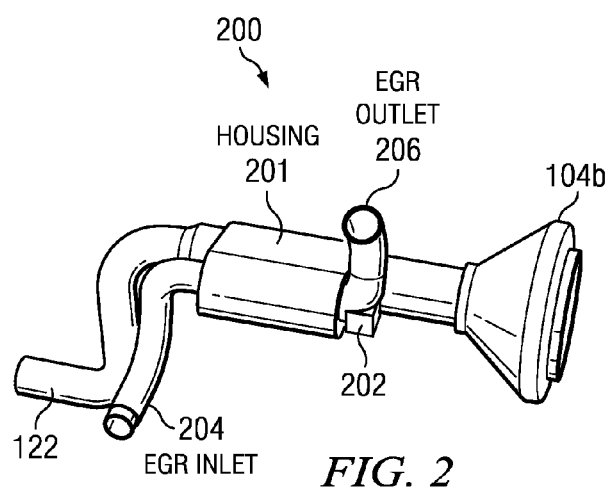
FIGS. 2 and 3 are perspective views of one embodiment of an integrated WGS/TWC device.
Figure 3:
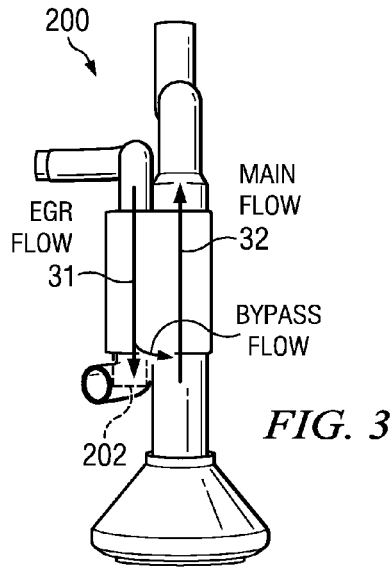

FIGS. 2 and 3 illustrate an integrated WGS/TWC catalyst 200 in accordance with the invention. Elements corresponding to elements of FIG. 1 have corresponding reference numerals.

Instead of a separate WGS catalyst 130 and TWC device 120, the functionality of these two catalysts is combined as a single integrated WGS/TWC device 200. Integrated WGS/TWC device 200 is suitable for placement in the engine compartment, in a manner similar to other closely coupled catalyst systems. However, it could also be placed underfloor.

WGS/TWC device 200 has one housing 201 with a common substrate. This substrate may be any type of substrate, known or to be developed, suitable for use in an emissions control device (ECD) and for accepting a catalytic formulation. The two catalyst portions of device 200 have separate parallel channels through the housing 201. The common substrate provides good conductive heat transfer from one channel to the other without fluid communication.

Referring specifically to FIG. 3, channel 31 is catalyzed for the WGS reaction, and is referred to as the "EGR flow" channel. Channel 32 is catalyzed as a TWC, and is referred to as the "main flow" channel. These channels 31 and 32 are not in fluid communication with each other; fluid communication is only achieved at valve 202. The EGR flow channel 31 and the main flow channel 32 can be formed into separate channels during the extrusion process used to form the catalyst substrate thereby forming a monolithic structure. Or the two channel could be formed by some other method that prevents fluid communication between the two channels, but that promotes thermal conduction between them.

The EGR flow is in one direction (from the exhaust manifold and back toward the intake manifold). The EGR inlet 204 is connected to the EGR exhaust port. The EGR outlet 206 is connected to the rest of the EGR loop. The main flow is in the opposite direction (from the exhaust manifold and out the tailpipe). An alternative configuration in which the two flows are in the same direction is discussed below in connection with FIG. 6.

Valve 202 allows EGR gas from the EGR channel to enter into the upstream end of the TWC channel. Thus, at valve 202, depending on the valve setting, EGR exhaust flows in either of two directions. At one setting, valve 202 allows EGR exhaust to enter the TWC portion of the catalyst and to exit the tailpipe. At this setting, the EGR exhaust "bypasses" the EGR loop. At another setting, valve 202 allows the EGR to continue on the EGR loop back to the intake manifold. In this manner, valve 202 enables modulation of the EGR rate without negatively impacting pollutant emissions.

Valve 202 is optional. In other embodiments, valve 202 could be omitted, such that EGR exhaust always travels only through the EGR channel 31.

As stated above, catalyst 200 can be a monolithic structure with fully partitioned WGS and TWC channels, 31 and 32 respectively. Many catalyst substrates have thousands of cells that are not in fluid communication through the catalyst; this feature of the substrate may be exploited for good heat transfer without fluid communication between the two channels. In other embodiments, the two channels with their separate catalysts could be joined together for good heat transfer.

The washcoat and precious metal loading is different for each channel. The main flow channel 32 has a catalyst formulation designed for three-way catalyst oxidation and reduction.

The EGR channel 31 has a catalyst formulation (washcoat and precious metal loading) optimized to promote the water-gas-shift reaction for exhaust, particularly for exhaust from rich combustion. This reaction converts CO and water vapor into CO2 and H2. The added H2 in the exhaust improves combustion in all cylinders. The WGS catalyst 130 also diminishes the pulsations in the EGR circuit which results in improved temporal EGR distribution.

Because the efficiency of a WGS catalyst is sensitive to the temperature of the exhaust gas and catalyst substrate, the integration of the WGS and TWC catalysts improves performance of the WGS catalyst and expands the engine operating range in which it operates effectively. The integration of the two catalysts also assists the TWC in reaching activation temperature sooner, especially during cold start engine conditions. Valve 202 may be operated as desired to deliver more heat energy to either catalyst for faster light-off times.

Valve 202 may be implemented any one of various valve configurations, and in its simplest form is a simple two-way valve. The valve opening may be variable to allow a controllable rate of the EGR flow to be bypassed to the main flow.

A suitable example of valve 202 is a valve similar to a turbocharger wastegate. The wastegate opens an orifice between the main exhaust and the D-EGR exhaust gas. The wastegate opens to obstruct the D-EGR flow to force some of the flow into the main exhaust before the TWC.

As indicated above, the integrated WGS/TWC device 200 allows the EGR channel 31 to heat up faster to activation temperature than if it were independently located. It is expected that the average temperature of the EGR channel will increase by 10-30% as compared to if it were separately located as in FIG. 1.

Figure 4A:
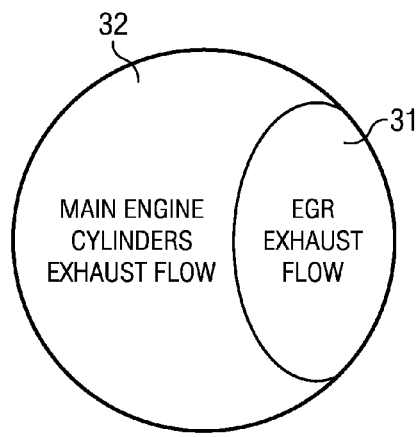
FIGS. 4A, 4B and 5 are cross sectional views of the integrated WGS/TWC device and illustrate examples of the interior portioning of its channels.
Figure 4B:
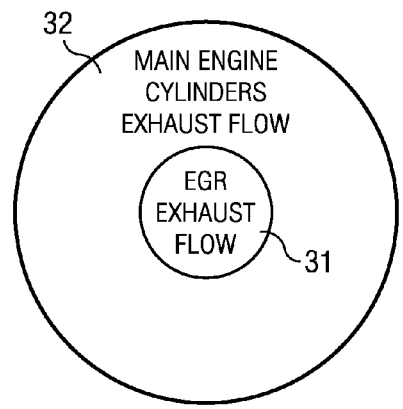
Figure 5:
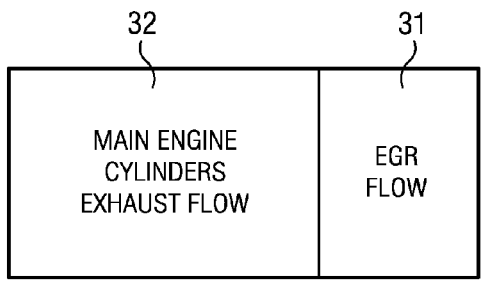

FIGS. 4A, 4B and 5 illustrate examples of cross-sectional partitioning of the substrate of catalyst 200. The EGR and main flow channels may have either a rectangular or rounded cross section. Typically, the EGR channel 31 is smaller than the main flow channel 32 because the EGR flow has less volume. The EGR channel's cross-sectional area and cell count can be optimized to promote the WGS reaction, as well as to decrease pressure pulsations from the inlet to the outlet.

In FIGS. 4A and 5, the EGR channel is portioned to one side of the catalyst. In FIG. 4B the channels are concentric; the inner channel is the EGR channel and the outer channel is the channel for the main exhaust flow.

Figure 6:
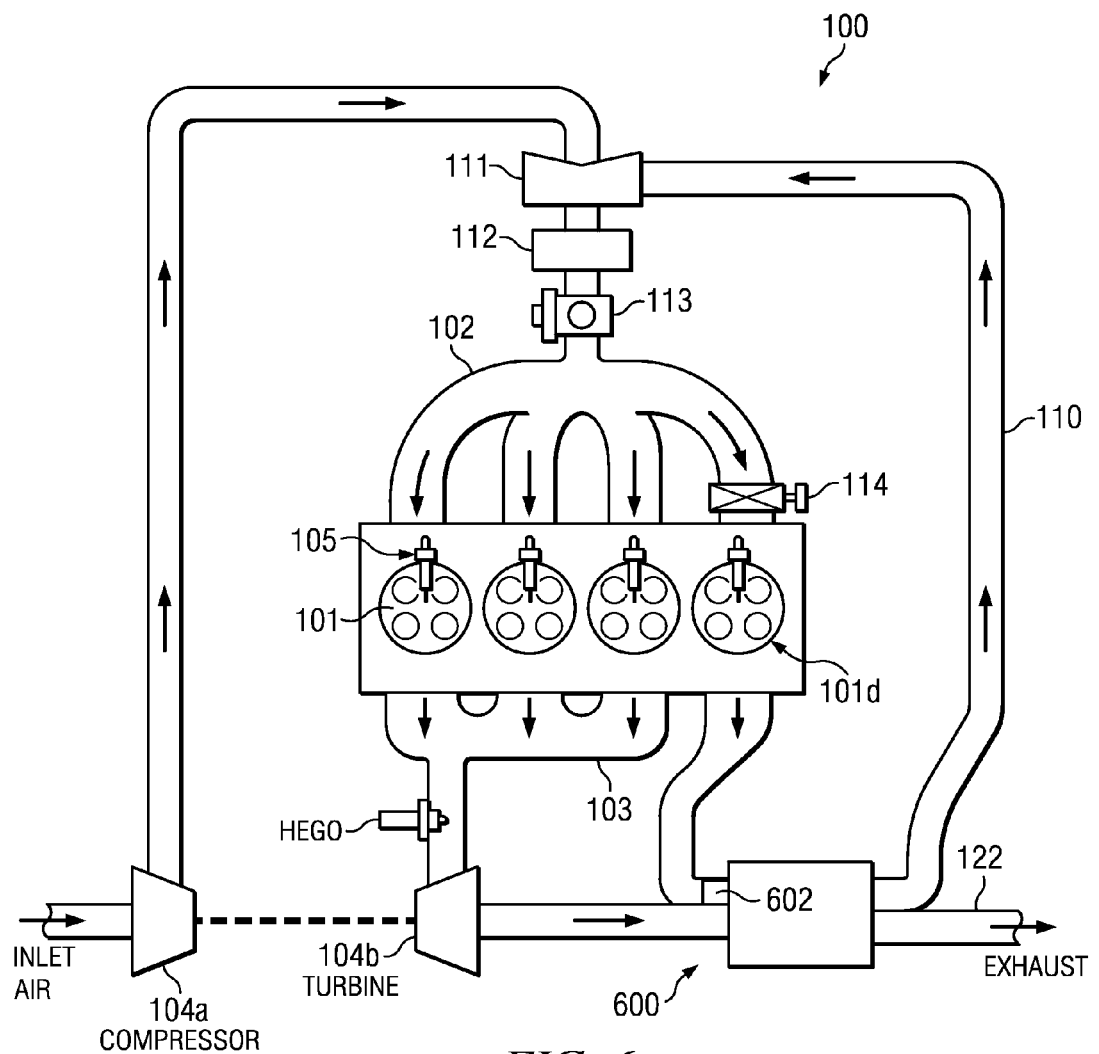
FIG. 6 illustrates another embodiment of the integrated WGS/TWC device, installed in the system of FIG. 1.

FIG. 6 illustrates an integrated WGS/TWC device 600 installed in the dedicated EGR system of FIG. 1. As shown, device 600 replaces WGS catalyst 130 and TWC 120. In this embodiment, flow in the EGR channel and the TWC channel channels is in the same direction. Valve 602 is at the inlet end of both the WGS channel and the TWC channel. In other respects, device 600 is similar to device 200.

As stated above, the use of an integrated WGS catalyst serving an EGR loop and a catalyzed emissions control device (ECD) serving the main exhaust line is not limited to engine systems having dedicated EGR. The EGR loop may be implemented as a high pressure loop or low pressure loop. In the former, the exhaust to be recirculated is extracted upstream of the turbine, whereas in the latter, the exhaust is extracted downstream the turbine.

Figure 7:
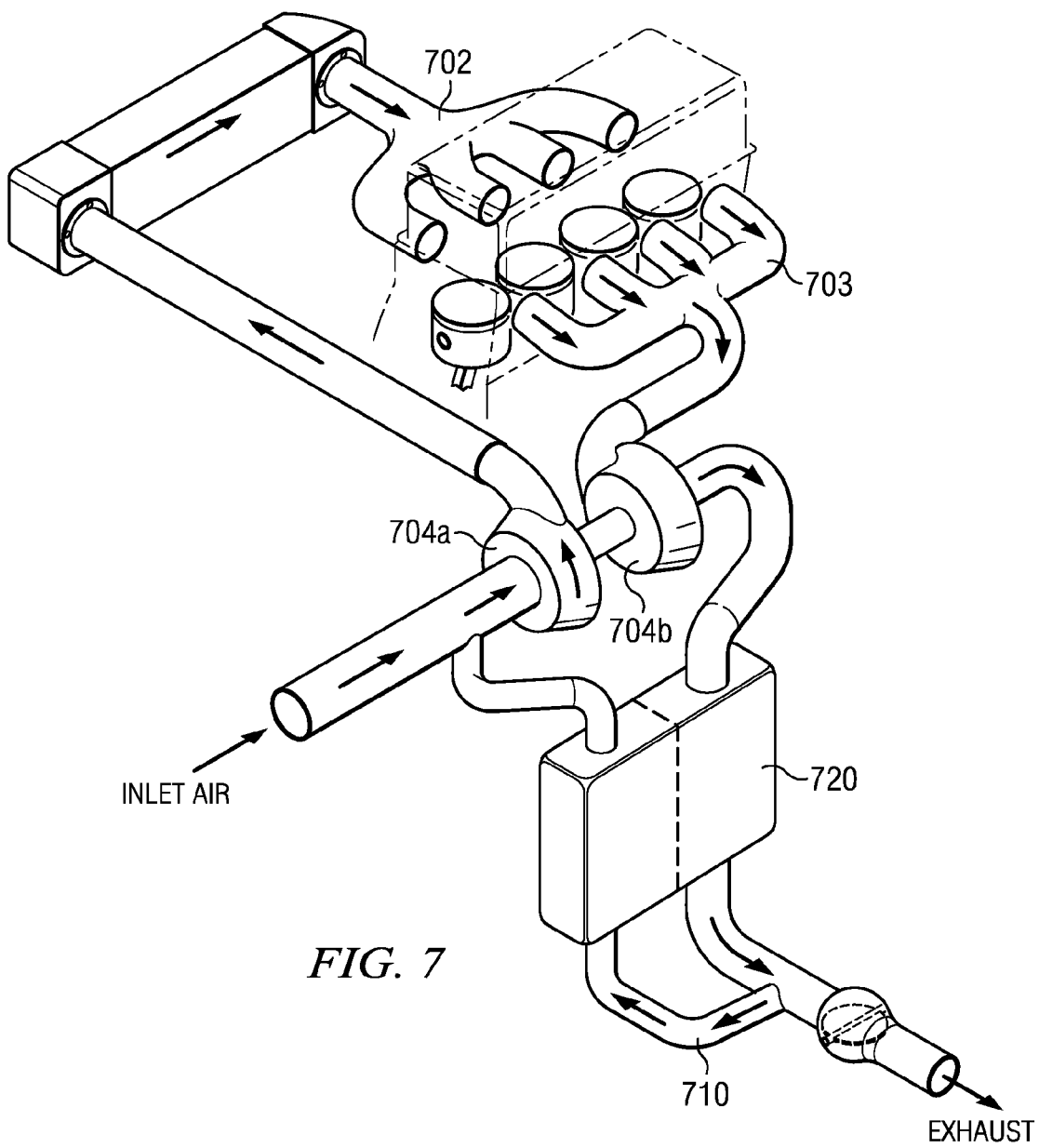
FIG. 7 illustrates an engine system (without dedicated EGR) having a low pressure EGR loop and having a WGS catalyst integrated with a catalyzed emissions control device (ECD).

FIG. 7 illustrates an engine system having non-dedicated EGR, implemented as a low pressure EGR loop 710, with an integrated WGS/ECD catalyst 720. Here, the integrated WGS/ECD catalyst 720 has an EGR channel and a main flow channel as described above. In general, the main flow channel is catalyzed as appropriate for the engine and its exhaust.

More specifically, like the main flow channel described above in connection with FIGS. 1-6, the main flow channel of the integrated catalyst 720 is catalyzed to remove emissions, and is appropriate for the type of engine. A stoichiometric engine might have a TWC catalyst as described above. A lean burn engine might have the main flow channel catalyzed as a lean NOx trap, NOx adsorber or selective reduction catalyst. Alternatively, the main flow channel could be a catalyzed particulate filter.

Exhaust from the exhaust manifold 703 travels to the turbine 704b and is treated by a main flow channel of the catalyst 720. EGR exhaust is treated by the EGR channel of the catalyst 720, which has a WGS catalyst. As in the above embodiments, a valve may be used to control flow between the channels.

Figure 8:
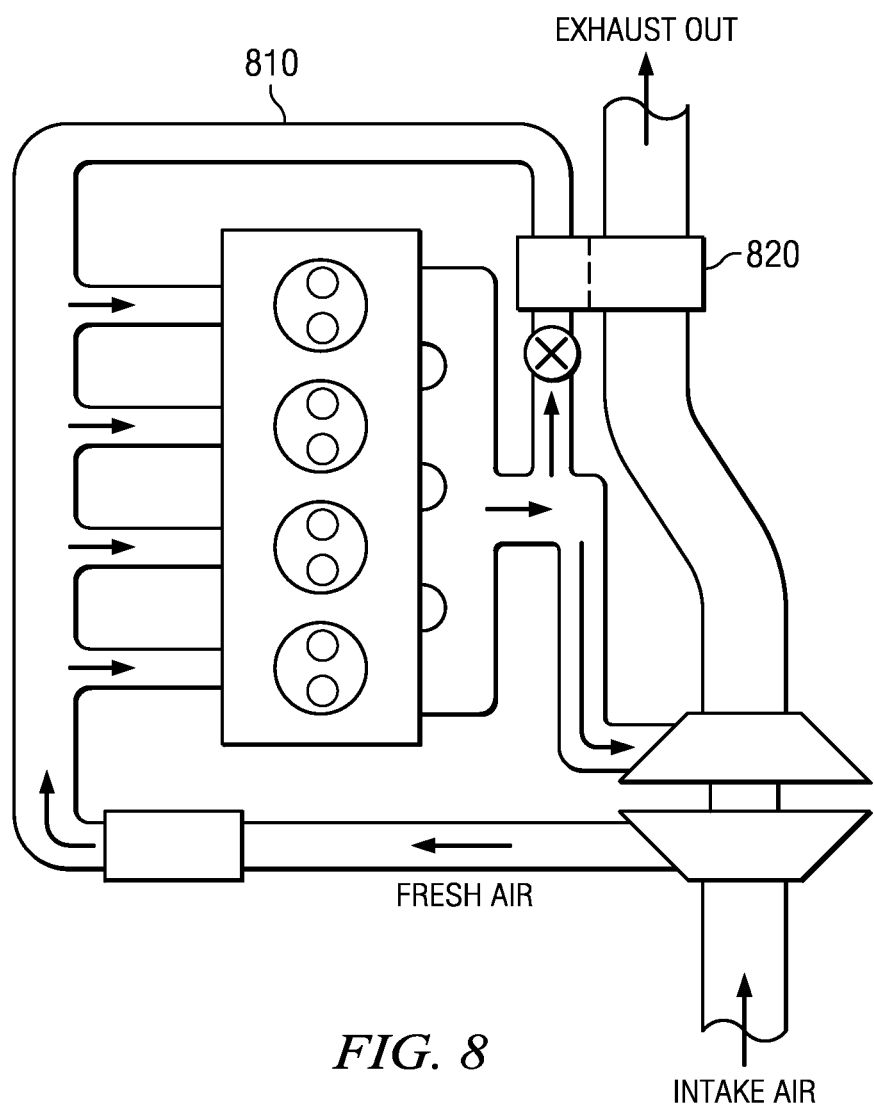
FIG. 8 illustrates an engine system (without dedicated EGR) having a high pressure EGR loop and having a WGS catalyst integrated with a catalyzed emissions control device (ECD).

FIG. 8 illustrates an engine system having non-dedicated EGR, implemented as a high pressure EGR loop 810, and an integrated WGS/ECD catalyst 820. As in the other embodiments, the integrated catalyst 820 has an EGR channel and a main flow channel with the main flow channel being catalyzed as appropriate for the engine and its exhaust.

In addition to the advantages stated above, the use of an integrated WGS/ECD device has additional benefits. The amount of hydrogen in the EGR loop is increased. Combustion stability (CoV IMEP; coefficient of variation of indicated mean effective pressure) and engine balance of IMEP is improved. Fuel consumption is reduced because of improved ignitability and combustion efficiency. EGR can be implemented at speeds and loads that would not be achievable with other EGR configurations.

What is claimed is:

1. An integrated WGS/ECD (water-gas-shift/emissions control device) catalyst for an internal combustion engine having an EGR (exhaust gas recirculation) loop and having a main exhaust line, comprising:
    a housing, the housing having a substrate suitable for coating with catalytic material and having an EGR channel and an ECD channel;
    wherein the EGR channel and the ECD channel are not in fluid communication;
    wherein the EGR channel and the TWC channel are parallel to each other;
    wherein the EGR channel provides fluid flow along the EGR loop and is configured with a WGS catalytic formulation; and
    wherein the ECD channel provides fluid flow for the main exhaust line and is configured with a catalyst formulation for reducing pollutant emissions from the engine.

2. The catalyst of claim 1, wherein the ECD channel is configured with one of the following catalyst formulations: lean NOx trap, NOx adsorber, or selective reduction catalyst.

3. The catalyst of claim 1, wherein the ECD channel is configured with a catalyzed particulate filter formulation.

4. The catalyst of claim 1, wherein the ECD channel is configured with a three-way catalyst.

5. An integrated WGS/TWC device for an internal combustion engine having a number of cylinders and in which at least one of the cylinders is a dedicated EGR cylinder configured such that all of the exhaust produced by that cylinder is recirculated to the intake manifold via an EGR loop, thereby providing EGR exhaust, comprising:
    a housing, the housing having a substrate suitable for coating with catalytic material and having an EGR channel and a TWC channel;
    wherein the EGR channel and the TWC channel are parallel to each other;
    wherein the EGR channel and the TWC channel are not in fluid communication;
    wherein the EGR channel provides fluid flow along the EGR loop and is configured with a water-gas shift catalytic formulation; and
    wherein the TWC channel provides fluid flow for exhaust from the cylinders other than the dedicated EGR cylinder and is configured with a three-way catalyst formulation.

6. The device of claim 5, wherein the integrated WGS/TWC device further has a valve configured to allow EGR exhaust to enter the TWC channel.

7. The device of claim 5, wherein the EGR channel and the TWC channel flow in the same direction.

8. The device of claim 5, wherein the EGR channel and the TWC channel flow in opposite directions.

9. A method of providing exhaust gas recirculation (EGR) in an internal combustion engine, comprising:
    directing a portion of the exhaust from the engine back to the engine's intake by means of an EGR loop;
    directing the remainder of the exhaust to a main exhaust line; providing an integrated WGS/ECD (water-gas shift/emissions control device) catalyst having a housing, the housing having a substrate suitable for coating with catalytic material and having an EGR channel and a ECD channel;
    wherein the EGR channel and the ECD channel are not in fluid communication with each other;
    wherein the EGR channel and the TWC channel are parallel to each other;
    wherein the EGR channel provides fluid flow along the EGR loop and is configured with a water-gas shift catalytic formulation; and
    wherein the ECD channel provides fluid flow for the main exhaust line and is configured with a catalyst formulation for reducing pollutant emissions from the engine.

10. The method of claim 9, wherein the integrated WGS/ECD catalyst further has a valve configured to allow EGR exhaust to enter the ECD channel.

11. The method of claim 9, wherein the EGR channel and the ECD channel flow in the same direction.

12. The method of claim 9, wherein the EGR channel and the TCD channel flow in opposite directions.

13. The method of claim 9, wherein the EGR loop is a high pressure loop.

14. The method of claim 9, wherein the EGR loop is a low pressure loop.

15. The method of claim 9, wherein the EGR loop is a dedicated EGR loop.

16. The method of claim 9, wherein the ECD channel is configured with one of the following catalyst formulations: lean NOx trap, NOx adsorber, or selective reduction catalyst.

17. The method of claim 9, wherein the ECD channel is configured with a catalyzed particulate filter formulation.

18. The method of claim 9, wherein the ECD channel is configured with a three-way catalyst.

* * * * *